(12) United States Patent
Volponi et al.

(10) Patent No.: US 7,472,100 B2
(45) Date of Patent: Dec. 30, 2008

(54) EMPIRICAL TUNING OF AN ON BOARD REAL-TIME GAS TURBINE ENGINE MODEL

(75) Inventors: Allan J. Volponi, West Simsbury, CT (US); Thomas Brotherton, Poway, CA (US)

(73) Assignee: United Technologies Corporation, Hartford, CT (US)

( * ) Notice: Subject to any disclaimer, the term of this patent is extended or adjusted under 35 U.S.C. 154(b) by 330 days.

(21) Appl. No.: 11/540,874

(22) Filed: Sep. 29, 2006

(65) Prior Publication Data
US 2008/0154823 A1    Jun. 26, 2008

(51) Int. Cl.
*G06F 17/00* (2006.01)
*G06N 5/00* (2006.01)

(52) U.S. Cl. .................................................. 706/45
(58) Field of Classification Search ................. None
See application file for complete search history.

(56) References Cited

U.S. PATENT DOCUMENTS

| | | | | |
|---|---|---|---|---|
| 5,481,648 | A * | 1/1996 | Volponi et al. ............... | 706/45 |
| 6,289,274 | B1 * | 9/2001 | Martucci et al. ............. | 701/100 |
| 6,466,858 | B1 * | 10/2002 | Adibhatla et al. ........... | 701/100 |
| 6,532,412 | B2 * | 3/2003 | Adibhatla et al. ........... | 701/100 |
| 6,909,960 | B2 * | 6/2005 | Volponi et al. ............... | 701/100 |
| 7,136,809 | B2 * | 11/2006 | Volponi ......................... | 704/201 |
| 7,216,071 | B2 * | 5/2007 | Volponi ........................ | 703/7 |
| 7,233,884 | B2 * | 6/2007 | Volponi ........................ | 702/189 |
| 7,277,838 | B2 * | 10/2007 | Volponi et al. ................. | 703/7 |
| 7,415,328 | B2 * | 8/2008 | Volponi ........................ | 701/9 |

FOREIGN PATENT DOCUMENTS

| | | |
|---|---|---|
| EP | 1 357 487 A2 | 10/2003 |
| EP | 1 637 944 A2 | 3/2006 |
| EP | 1 643 332 A2 | 4/2006 |

OTHER PUBLICATIONS

Adaptive On-Wing Gas Turbine Engine Performance Estimation Luppold, R.; Brotherton, T.; Volponi, A.; Aerospace Conference, 2007 IEEE Mar. 3-10, 2007 pp. 1-12 Digital Object Identifier 10.1109/AERO.2007.352836.*

Monitoring blade passage in turbomachinery through the engine case (no holes) Roeseler, C.; von Flotow, A.; Tappert, P.; Aerospace Conference Proceedings, 2002. IEEE vol. 6, 2002 pp. 6-3125-6-3129 vol. 6 Digital Object Identifier 10.1109/AERO.2002.1036153.*

Identification and air-fuel ratio control of a spark ignition engine Jones, V.K.; Ault, B.A.; Franklin, G.F.; Powell, J.D.; Control Systems Technology, IEEE Transactions on vol. 3, Issue, 1, Mar. 1995 pp. 14-21 Digital Object Identifier 10.1109/87.370705.*

(Continued)

*Primary Examiner*—Michael B Holmes
(74) *Attorney, Agent, or Firm*—Bachman & LaPointe, P.C.

(57) ABSTRACT

A real-time on board engine component performance tracking system for deriving high fidelity engine models capable of providing a reference level from which performance changes can be trended with reduced operating cost, increased safety, and increased reliability while minimizing memory requirements and maximizing speed.

28 Claims, 14 Drawing Sheets

OTHER PUBLICATIONS

European Search Report for European Patent Application No. 07252989.4, Dated Nov. 29, 2007.

Simani S: "Hybrid Model Identified For Fault Diagnosis Of Non-Linear Dynamic Processes" American Control Conference, 2004. Proceedings of the 2004 Boston, MA, USA Jun. 30-Jul. 2, 2004, Piscataway, NJ, USA, IEEE, vol. 3, Jun. 30, 2004, pp. 2445-2450, XP010761190 ISBN: 0-7803-8335-4 p. 2445-p. 2450.

Volponi A et al: "A Bootstrap Data Methodology for Sequential Hybrid Engine Model Building" Aerospace, 2005 IEEE Conference Big Sky, MT, USA 05-Mar. 12, 2005, Piscataway, NJ, USE, IEEE, Mar. 5, 2005, pp. 1-9, XP010864586 ISBN: 0-7803-8870-4 p. 1-p. 8.

Simani S et al: "Fault diagnosis of non-linear dynamic processes using identified hybrid models" 42nd, IEEE Conference on Decision and Control.(CDC). Maui, HI, Dec. 9, vol. vol. 1 of 6. Conf. 42, Dec. 9, 2003, pp. 445-450, XP010686227 ISBN: 0-7803-7924-1 the whole document.

\* cited by examiner

EMPIRICAL TUNING OF AN ON BOARD REAL-TIME GAS TURBINE ENGINE MODEL

GOVERNMENT CONTRACT

The Government of the United States of America may have rights in the present invention pursuant to Contract-No. NAS3-01138 awarded by the National Aeronautics and Space Administration.

BACKGROUND OF THE INVENTION

The invention relates generally to the field of mathematical modeling. More specifically, the invention relates to a method and system for developing a real-time gas turbine engine model.

Early real-time gas turbine engine models used piecewise linear state variable models (SVM) that described a reasonable behavior of an engine during steady state operation and mild transients. As processor speeds increased, more complex models that were a combination of linear and non-linear physics based elements were created. While the latter provided greater fidelity for transient operation and an engine's operational flight envelope, the accuracy required for long-term performance tracking as well as the need to address engine-to-engine variation needed improving.

Shown in FIG. 1 is an early on-board engine model system 101 used for performance tracking. The major components include the monitored engine 103, a physics-based engine model 105 and a performance estimation module 107. The physics-based engine model 105 is typically an SVM and the performance estimation module 107 is a Kalman filter observer.

The engine model 101 is driven by a set of input parameters 109 that command the engine 103. The input parameters comprise flight parameters such as Mach number, altitude, ambient conditions and others, and power setting parameters such as fuel flow, engine bleed air commands, variable geometry vane commands and others. The monitored engine output parameters 111 comprise gas path parameters such as internal shaft speeds, compressor, combustor and turbine temperatures and pressures and others. The physics-based engine model 105 outputs estimated parameters 113 corresponding to each engine 103 output parameter 111.

The estimated parameters 113 may be used for a variety of purposes. The parameters 113 provide for analytical redundancy if a channel mismatch were to occur, for example, in a multichannel redundant system such as a Full Authority Digital Engine Control (FADEC) (not shown), serving as an auctioneer between two redundant signals that have different values.

The physics-based engine model 105 estimated output parameters 113 are compared with the engine output parameters 111 to form residuals 115. If the physics-based engine model 105 is an accurate representation of the monitored engine 103, the residuals 115 should be close to zero on the average. However, as engine performance deteriorates over time, the residuals 115 deviate from zero.

The performance estimator 107 uses the residuals 115 to observe changes in performance across the engine's modules, in the form of adiabatic efficiencies, flow capacities, and turbine nozzle area deltas. This type of analysis is referred to as Gas Path Analysis (GPA) or Module Performance Analysis (MPA). The disparities between the physics-based engine model 105 and engine 103 outputs are used to modify the performance output of the engine model 105 estimated outputs 113 to drive the residuals 115 to zero (on the average). In this manner, the physics-based engine model 105 estimated outputs 113 more accurately reflect the current state of the engine 103 and the module performance deltas can be tracked over time to aid in determining proper engine work scope when the engine is removed for maintenance.

The model 101 described above represents an ideal situation where the physics-based engine model 105 is a faithful representation of the engine 103 being monitored. However, the physics-based engine model 105 does not hold true over time. Engine-to-engine variations, models simplified in order to run real-time and deviations caused by improvements to the engine's hardware, bleed and stator vane schedules, cooling flows, handling bleeds and others, over the engine's life cycle are not reflected in the model 105 and contribute to output disparities between the physics-based engine model 105 and engine 103. The disparities result in inaccurate and misleading estimations in the module performance tracking for the system 101.

One approach taken to obviate engine model deviations over time is a hybrid engine model. The hybrid model incorporates both physics-based and empirical components. The hybrid architecture automatically modifies a derived engine model to a particular configuration as an engine's characteristics change over its service life and conforms the model to the engine to insure accurate performance tracking.

FIGS. 2 and 3 show hybrid gas turbine engine modeling configurations. The hybrid system 201 shown in FIG. 2 derives an empirical model (EM) 203. The EM 203 represents the differences, or residuals 115, between measured engine output parameters 111 and the physics-based model output parameters 113. The engine 103, the physics-based engine model 105 and the EM 203 are driven by the same input parameters 109. The input parameters 109 may vary depending on engine type and application.

Once the EM 203 is derived, a hybrid engine model 301 may be implemented as shown in FIG. 3. An engine performance estimation 107 is used to track engine performance deviations for engine health diagnostic and prognostic purposes. This typically takes the form of a gas path analysis that estimates performance changes in the major modules of the engine on the basis of residual changes in parameters observed in the engine's gas path, such as temperatures, pressures, speeds, and others.

The performance changes are usually given in terms of thermodynamic parameters, such as changes in adiabatic efficiency and flow capacity for the compression modules, and changes in adiabatic efficiency and nozzle area for the turbine modules. Since the residual gas path data is used in this determination, the reference (from which the changes are estimated) is the engine model under consideration.

The EM 203 may use relationship models such as regression, autoregressive moving average (ARMA), artificial neural network (ANN), and others for prediction. The hybrid model 301 includes a physics-based engine model 105 and an EM 203 that models the difference between the physics-based engine model 105 and the engine 103 being monitored. The addition 305 of the physics-based engine model 105 and EM 203 outputs produces a hybrid model 303 representation of the monitored engine 103 as it appeared during the period of operation when residual data was gathered and processed to form the empirical element. A Kalman filter observer 107 is provided to perform the gas path analysis to monitor the engine's health 307 after the empirical model 203 is available.

To be effective, the system identification methods shown in FIGS. 2 and 3 should be performed on board in real-time during engine operation and flight to negate the need for establishing a data infrastructure to capture, store and transfer the requisite data for modeling to a ground computer for developing the empirical model element. Otherwise, the system 301 shown in FIG. 3 would require the storage and retention of engine and flight input data over a series of flights until a sufficient amount of flight and engine regime data was accumulated to complete the EM 203. This would impose an unrealistic storage capacity requirement for the system.

To reduce the size of the modeling problem as well as the amount of flight data storage required to fit the model, one methodology incrementally builds an EM using a flight envelope partition to create smaller EM sub-models. An example of a flight envelope partition is shown in FIG. 4.

The flight envelope is given in terms of altitude and Mach number and defines the flight regime for which the engine under consideration is equipped to operate. The partition is simply a subdivision of this region into smaller regions referred to as cells 401. These regions are typically taken to be rectangular areas and are characterized by their height (altitude) and width (Mach) and a center coordinate 403. Data collected within a given cell is used to generate an empirical sub-model that represents the difference between the physics-based engine model estimated parameters and the actual engine's measured parameters in that region of the flight envelope. These empirical sub-models are incrementally assembled as flight data becomes available in a given cell.

The partitioning of the flight envelope contributes to the concept of sequential modeling in that it allows the construction of a series of sub-models to represent the model space. Since the flight envelope grid is predefined in order to limit the number of sub-models, it is likely that insufficient data within a given grid element would be collected during a single flight to properly model that subspace. No matter what particular modeling methodology is used, the entire set of data would have to be maintained for the proper modeling of the given sub-region. Extending this process across the entire partitioned flight envelope would require storing an enormous amount of data that would be impractical and prohibitive.

What is desired is a methodology for constructing the empirical model in an incremental manner without the requirement for storing all of the original data.

SUMMARY OF THE INVENTION

Although there are various methods and systems modeling gas turbine engine operational behavior, such models are not completely satisfactory. The inventors have discovered that it would be desirable to have methods and systems that model gas turbine engines using empirical sub-models as tuning elements. The methods and systems involve sequentially developing and storing a compact statistical and parametric representation of flight data collected in real-time. During an off-line process, the data may be used to generate a statistically representative set of pseudo-data samples that are used to update an empirical engine model. The invention provides a computation and storage reduction in excess of 1000:1 over previous methodologies.

One aspect of the invention provides methods for training a multi-layer network used in conjunction with a physics-based engine model to define a hybrid model for modeling a gas turbine engine used for flight. Methods according to this aspect of the invention preferably start with inputting an input signal to the gas turbine engine for operational control and to the physics-based engine model, wherein the input signal comprises a plurality of parameters, combining output parameters from the gas turbine engine with corresponding parameters estimated by the physics-based engine model to form a residual for each parameter, the gas turbine output parameters and physics-based engine model estimated parameters are responsive to the input signal parameters, deriving a mean and a standard deviation for each parameter of a first predetermined number of the input signals, deriving a mean and a standard deviation for residuals responsive to the first predetermined number of the input signals, associating a mean Mach and a mean altitude, wherein the Mach and altitude are input signal parameters, with one of a plurality of flight envelope cells, wherein if a parameter of the input signal or a responsive residual parameter is included in a pre-existing statistical distribution, the pre-existing distribution is used for training the multi-layer network, and if the mean Mach and the mean altitude are not included in a pre-existing statistical distribution, a new statistical distribution is created comprising the mean and standard deviation for each parameter of the first predetermined number of the input signals, the mean and standard deviation for residuals responsive to the first predetermined number of the input signals, and the first predetermined number value.

Another aspect of the method is comparing each independent input signal parameter from the input signal with pre-existing statistical distributions within the associated cell, wherein if an independent parameter of the input signal is included in a pre-existing statistical distribution, the pre-existing distribution is used for training the multi-layer network, and if an independent parameter of the input signal is not included in a pre-existing statistical distribution, a new statistical distribution is created for each input signal parameter from the input signal.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

The invention is a modular framework and is deployed as software as an application program tangibly embodied on a program storage device. The application code for execution can reside on a plurality of different types of computer readable media known to those skilled in the art.

Embodiments of the invention provide methods and systems that derive high fidelity models for gas turbine engines. The models are capable of providing a reference level from which actual engine performance changes may be trended with increased reliability and speed, and reduced operating cost and computational expense.

The invention comprises methods and systems that implement a two-stage empirical modeling process for a gas turbine engine. The first stage is executed in real-time during flight operation and performs a flight data reduction to encapsulate a reduced order representation of input and residual parameter differences that are modeled during the second stage. The reduction is accomplished in real-time using a sequential clustering process that leverages the continuous nature of flight data to reduce processing time and memory resources to create a plurality of Gaussian Mixture Models (GMM).

The second stage may be performed in real-time or off-line, usually at the end of a flight, after the first stage processing has been completed. The second stage uses the GMM representations of the data accumulated during the first stage processing. The GMM data that accumulates comprises the last flight and all previous flights. The data is used to derive an EM that is used in conjunction with a physics-based engine model to provide a high fidelity hybrid engine model. The physics-based engine model is used to produce residuals during the first stage.

Figure 5:
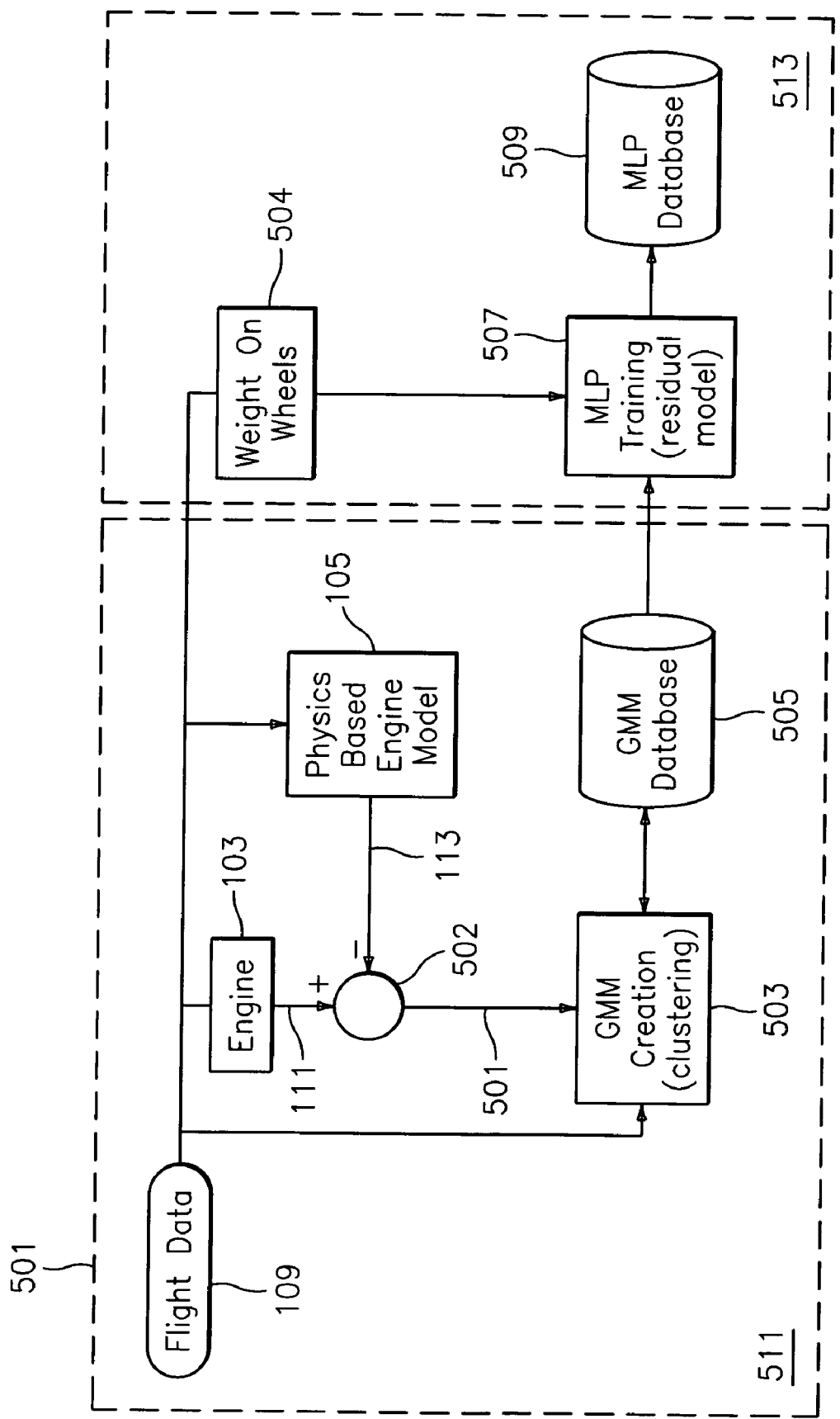
FIG. 5 is an exemplary two stage system for training a multi-layer network according to the invention.

Shown in FIG. 5 is the two-stage training system 501 of the invention. The system 501 is used in conjunction with an actual gas turbine engine 103 that is the subject to be modeled and comprises a physics-based engine model 105, a GMM clustering engine 503, a GMM data store 505, an MLP training engine 507 and an MLP data store 509. The first stage 511 method uses the physics-based engine model 105, GMM clustering engine 503 and GMM data store 505. The second stage 513 method uses the MLP training engine 507 and MLP data store 509 to add to and refine an EM model 203 used in a hybrid engine model 301.

Input signals 109 are coupled to the engine 103 for control and to the physics-based engine model 105 and GMM clustering engine 503. The inputs signals 109 represent a plurality of independent parameters. The independent parameters comprise flight conditions such as altitude and Mach, engine power descriptors such as corrected spool speed, engine bleed air commands and variable geometry vane commands, and other information such as weight on wheels to indicate when an aircraft has landed 504. Engine 103 outputs 111 represent a plurality of measured gas path parameters such as temperatures, pressures, speeds, flows, and others.

The input signals 109 command the physics-based engine model 105 which models engine 103 behavior contemporaneous with actual engine 103 behavior. Both the engine 103 and physics-based engine model 105 output the same number of different gas path parameters. The engine 103 outputs 111 and physics-based engine model 105 output estimates 113 are coupled to a summer 502 to produce residuals 501. The residuals 501 represent differences between the outputs, actual 111 versus estimated 113, indicating the accuracy of the physics-based engine model 105. The residuals 501 are coupled to the GMM clustering engine 503.

Figure 4:
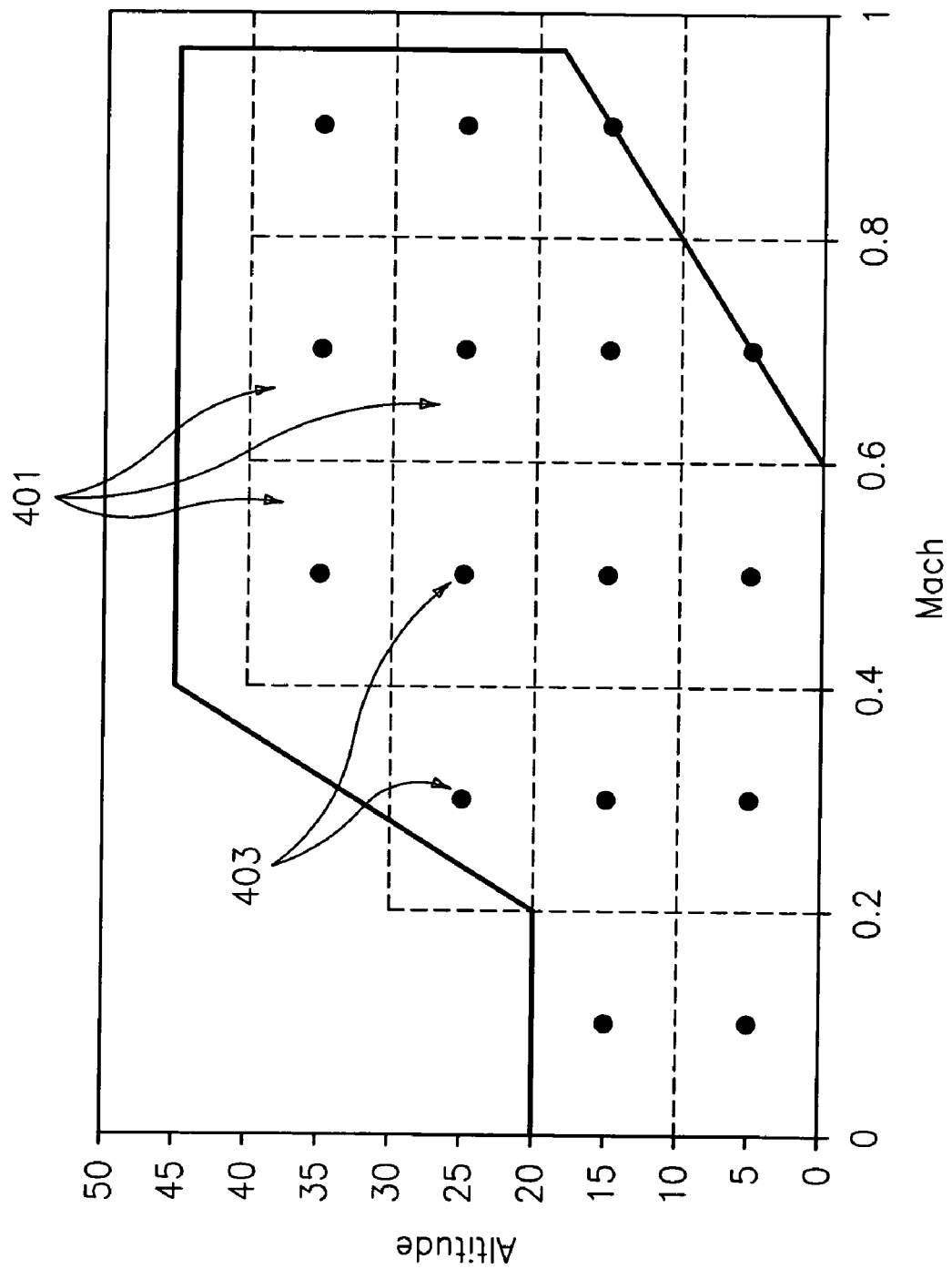
FIG. 4 is an exemplary flight envelope plot.

To reduce the complexity of an empirical model 203 used in a hybrid engine model 303, a flight envelope partition as shown in FIG. 4 is employed. The flight envelope partition reduces the amount of memory resources and computational expense by dividing the empirical modeling task into separate sub-models.

The flight envelope partition divides an operational flight envelope into n cells 401 that become the sub-model domains. To determine which cell 401 is active and which cell flight data belongs to, each cell 401 may have equal dimensions. For example, a 0.2 Mach width by 10,000 ft height. An altitude and Mach number coordinate pair identifies the center 403 of each cell. The flight envelope partition is known a priori and may be stored in the MLP data store 507 as a look-up table (LUT).

The GMM clustering engine 503 is coupled to the GMM data store 505. The GMM data store 505 holds data output by the GMM clustering engine 503 that relates to the reduced order encapsulation of the physics-based engine model 105 and residuals 501. The GMM data store 505 is coupled to the MLP training engine 507. The GMM data 505 acquired during flight is used by the MLP training engine 507 during the second stage 513 off-line process to create new, and update previous EM sub-models.

The data is stored as a multi-layer network. This class of networks consists of multiple layers of computational units, usually interconnected in a feed-forward manner. Each neuron in one layer has directed connections to the neurons of the subsequent layer.

The first 511 and second 513 stages operate on a flight envelope cell-by-cell basis. Residuals 501 derived during flight are associated with a respective flight envelope cell 401 via Mach and altitude. A GMM created by the GMM clustering engine 503 is stored in the GMM data store 505 and is subsequently used to construct EM sub-models during the second stage 513. In the preferred embodiment, the data is stored as a series of multi-layer perceptron (MLP) neural networks. The EM 203 used in a hybrid model 303 is updated with the series of MLPs. The MLP data store 509 holds sub-models for each flight envelope cell 401. The EM 203 is derived incrementally during the second stage 513.

Models such as high order statistical regression, neural networks, support vector machines and others may be used. This class of neural networks consists of multiple layers of computational units known as universal approximators. They are referred to as feed-forward, back propagation artificial neural networks and are employed for functional approximation in numerous engineering applications. They are defined by a series of layers consisting of an input layer, a hidden layer, and an output layer. Each layer consists of a number of neurons which perform an arithmetical operation.

In the invention, the number of neurons in the input layer is equal to the number of input signal parameters 109, the number of hidden layer neurons is fixed by a user (25 has been found to be adequate), and the number of output layer neurons may be equal to 1. With regard to the output layer, the single neuron computes the estimate of a single residual parameter. This means that an MLP is created and updated for each residual parameter. Alternatively, the system may be configured to have the number of output layer neurons equal the number of residual parameters, thereby requiring one MLP per cell, however, this configuration would require a much larger hidden layer, in excess of 25.

The GMMs 503 created by the clustering engine 503 are multi-dimensional Gaussian distributions characterized by two statistical vectors, a mean, and a measure of dispersion or standard deviation. To facilitate the construction of the MLP 507 during the second stage 513, the sample size from which the statistical quantities are computed is also stored with a GMM. The mean and standard deviation vectors contain the input signal parameters 109 as well as the residual parameters 501.

The residual vector 501 r is determined as the difference between each measured engine output 111 y and its corresponding physics-based engine model 105 output estimate 113.

The engine 103 signal inputs 109 u may include altitude, Mach number, fuel flow demand, engine bleed air commands, active clearance control commands, variable geometry vane commands, as well as other engine input parameters. The engine 103 outputs 111 y and residuals 501 r may include engine speeds, interstage temperatures and pressures, flows, and others. A GMM created by the clustering engine 503 may comprise mean and standard deviation vectors pertaining to the signal inputs 109 and residuals 501 that are computed recursively during GMM clustering 503.

The mean $\bar{u}_N$ and standard deviation $\sigma_N^{(u)}$ vectors for the signal inputs 109 and the mean $\bar{r}_N$ and standard deviation $\sigma_N^{(r)}$ vectors for the residuals 501 are computed recursively to minimize computation time and memory expense. The mean $\bar{u}_N$ and standard deviation $\sigma_N^{(u)}$ vectors for the inputs 109 are $$\bar{u}_N(i) = \left(\frac{N-1}{N}\right)\bar{u}_{N-1}(i) + \left(\frac{1}{N}\right)u_N(i), \text{ and} \quad (1)$$

$$\sigma_N^{(u)}(i) = \sqrt{\left(\frac{N-2}{N-1}\right)[\sigma_{N-1}^{(u)}(i)]^2 + \left(\frac{1}{N}\right)(u_N(i) - \bar{u}_{N-1}(i))^2}, \quad (2)$$

for all I, $\forall i=1, 2, \ldots, m_c$, where $m_c$ is the number of input signal parameters 109. The mean and standard deviation vectors of the residuals 501 are computed recursively as well using $$\bar{r}_N(i) = \left(\frac{N-1}{N}\right)\bar{r}_{N-1}(i) + \left(\frac{1}{N}\right)r_N(i), \text{ and} \quad (3)$$

$$\sigma_N^{(r)}(i) = \sqrt{\left(\frac{N-2}{N-1}\right)[\sigma_{N-1}^{(r)}(i)]^2 + \left(\frac{1}{N}\right)(r_N(i) - \bar{r}_{N-1}(i))^2}, \quad (4)$$

for all I, $\forall i=1, 2, \ldots, m_r$, where $m_r$ are the derived residuals 501. $\bar{u}_N$ and $\sigma_N^{(u)}$ represent $m_c \times 1$ vectors of (running) input 109 means and standard deviations, and $\bar{r}_N$ and $\sigma_N^{(r)}$ represent $m_r \times 1$ vectors of residual 501 means and standard deviations after N data points have been processed. Since an input signal is comprised of a plurality of individual parameters in discrete time, a data point is defined as one input signal vector and one residual vector comprising all input parameters and residual parameters at time t, at a frequency in a range of about 5-50 Hz.

When GMM clustering 503 terminates (as described below), the mean $\bar{u}_N$, $\bar{r}_N$ and standard deviation $\sigma_N^{(u)}$, $\sigma_N^{(r)}$ vectors with their respective sample sizes N at termination are stored in the GMM data store 505.

Figure 6:
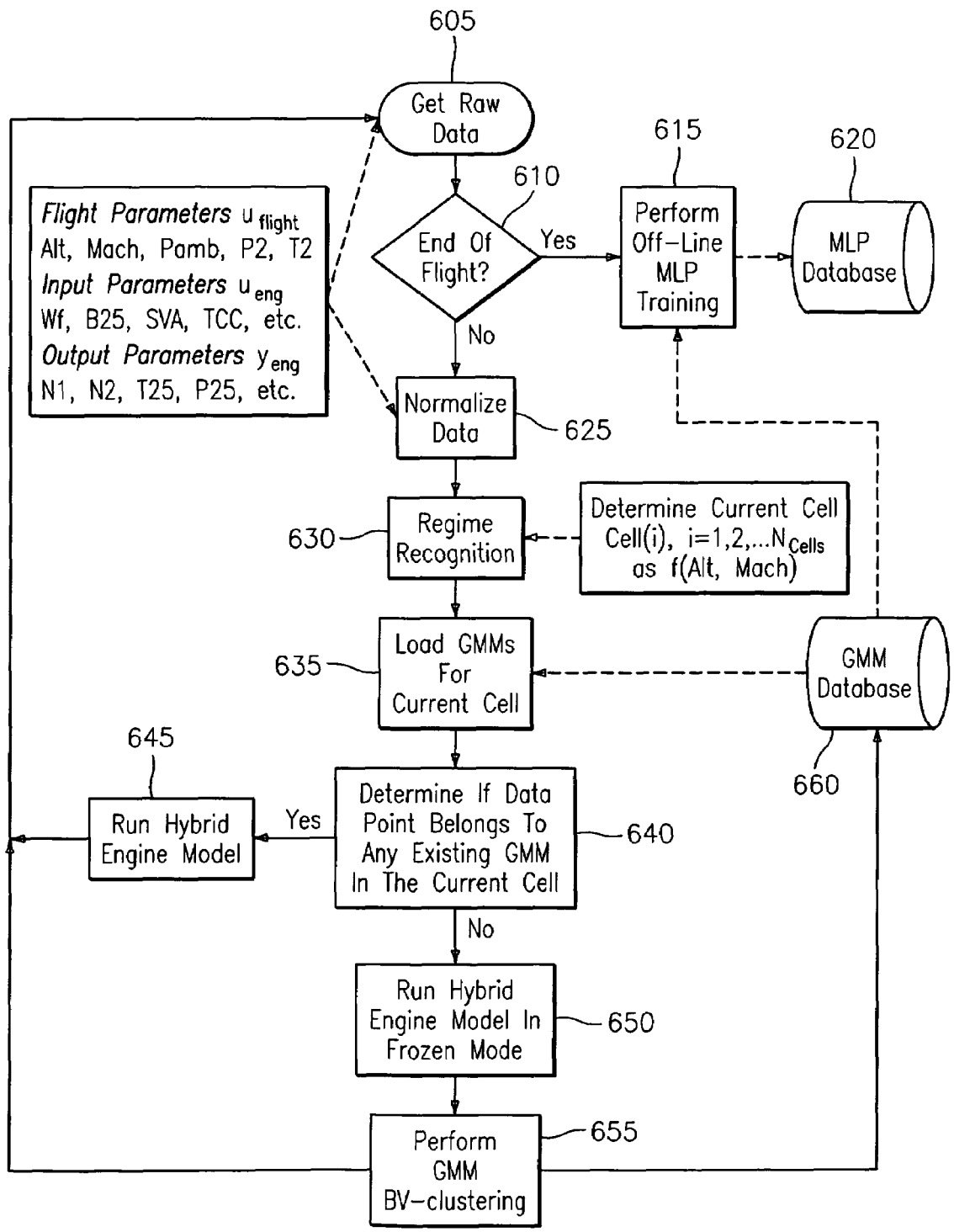
FIG. 6 is a block diagram of an exemplary method for creating a compact statistical representation of incoming real-time data interacting with a performance tracking element according to the invention.

Shown in FIG. 6 is a method overview showing the data flow for the hybrid model training system 501 as an EM 203 is created incrementally. The GMM clustering engine 503 continuously processes input signal data 109 and derived residuals 501 as an aircraft transcends a trajectory through the flight envelope cells 401.

The method determines whether a flight has terminated (steps 605 and 610) by monitoring a number of aircraft parameters such as weight-on-wheels 504. If a flight is in progress, the system 501 monitors input signal data 109 and derived residuals 501, performs clustering 503 and stores the GMMs 505. When the flight ends, the system 501 stops acquiring data 109, 501 and performs an EM update 203 (step 615) by re-evaluating the MLP sub-models in the MLP data store 509 (steps 615, 620).

As a data point is received, vectors $\bar{u}_N$ and $\bar{r}_N$ are normalized (step 625) to reduce variability in the data. Normalization applies standard corrections such as gas path standard day corrections to remove the effects of ambient temperature and pressure, and flight condition, as well as to reduce the complexity of the empirical modeling effort.

After normalization (step 625), normalized input parameters altitude and Mach are used to determine which cell 401 the data corresponds to (step 630). This may be performed by calculating the distance from the altitude and Mach number the data corresponds to with a cell center (known a priori), and selecting the cell that yields the shortest distance, $$\text{Cell\_Number} = \underset{i=1,2,\ldots,N_{Cell}}{\arg\min}\left(\sqrt{\frac{(Alt_i^* - Alt^*)^2}{\sigma_{Alt}^2} + \frac{(Mach_i^* - Mach^*)^2}{\sigma_{Mach}^2}}\right), \quad (5)$$

where $N_{Cell}$ is the total number of cells, a superscript * denotes a normalized quantity, for example, $Alt_i^* = Alt_i/50000$ ft, and $\sigma$ is an assumed variability in the measurement (standard deviation).

After a cell 403 is identified, a GMM is defined and any existing GMM models that are present in the GMM data store 509 for that respective cell are loaded (step 635).

A determination is performed if the current data point is represented by an existing GMM model (step 640). If a GMM already exists for that data point, no update is necessary and a hybrid model 303 may be run with the existing data (step 645).

If the current data point is not included within an existing GMM, the hybrid model 303 is executed in a frozen state (step 650). A frozen state is where the last known performance Δ estimate, produced as output from 107, is held constant. The performance Δs are typically given as changes in engine module adiabatic efficiencies, flow capacities, and turbine nozzle areas. By maintaining these last known performance Δ estimates, the residuals 307 produced will not be corrupted by engine 103 deterioration and represents the difference between the engine 103 and the physics-based engine model 105 in the current region of the flight envelope that has not been empirically modeled. The GMM clustering engine 503 (step 655) will create a new GMM element from the residual data.

The initiation and determination of a new GMM element uses a method that includes an exit criterion to determine when to stop the GMM building process. Since a GMM represents a multi-dimensional cluster, representing all parameters, the method needs to determine when to exit the cluster building calculation. The criterion depends on the number of data points collected to represent the current GMM cluster, which itself depends on certain stability calculations as well as a distance migration from cluster initiation.

Figure 7:
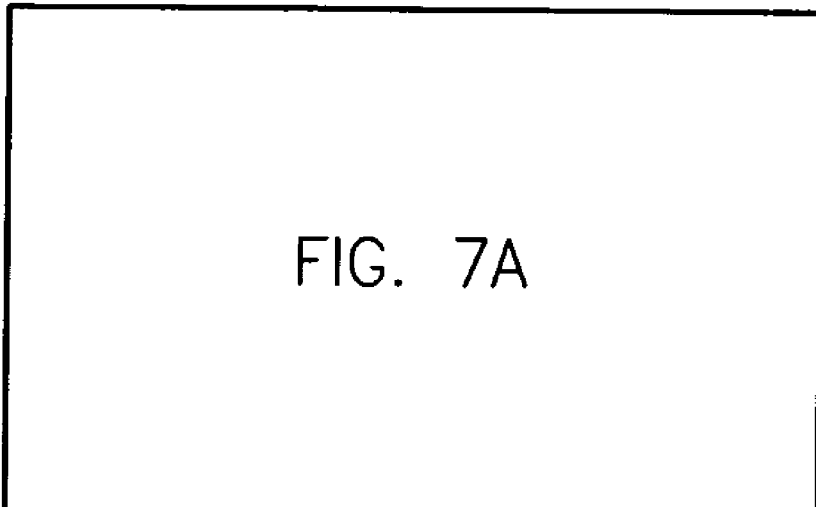
FIG. 7 is a block diagram of an exemplary Gaussian learning model method performing data clustering according to the invention.
Figure 7:
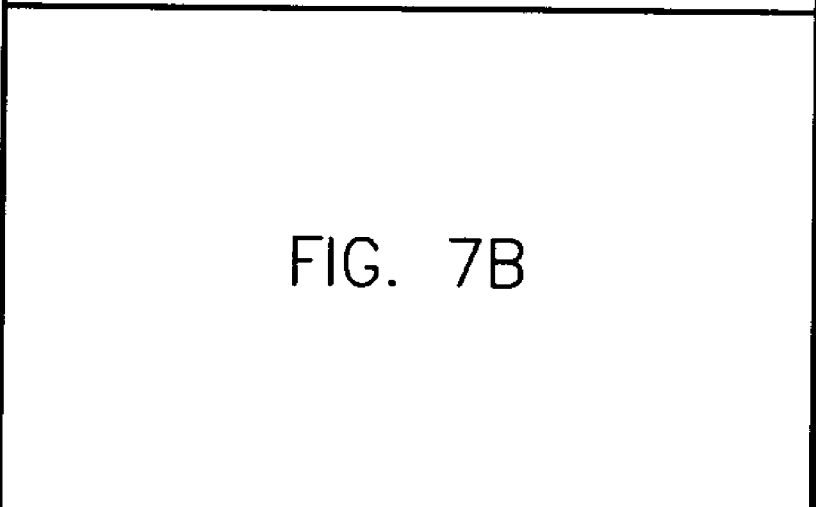
Figure 7:
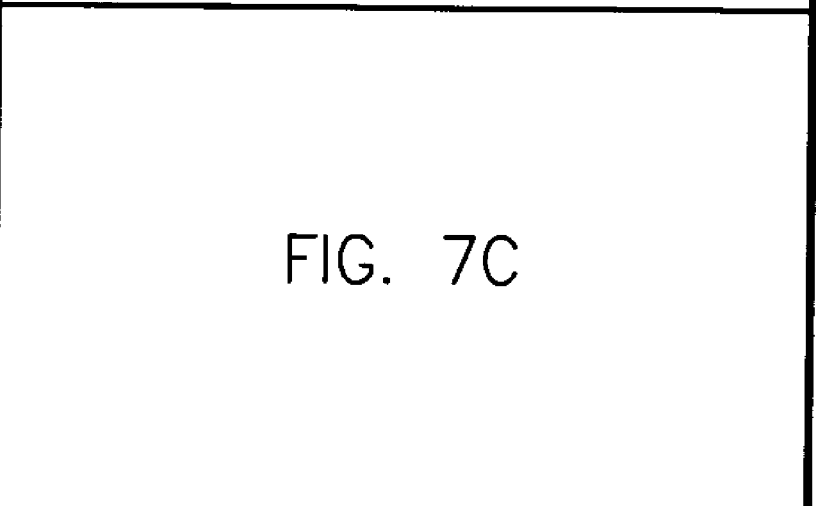
Figure 7A:
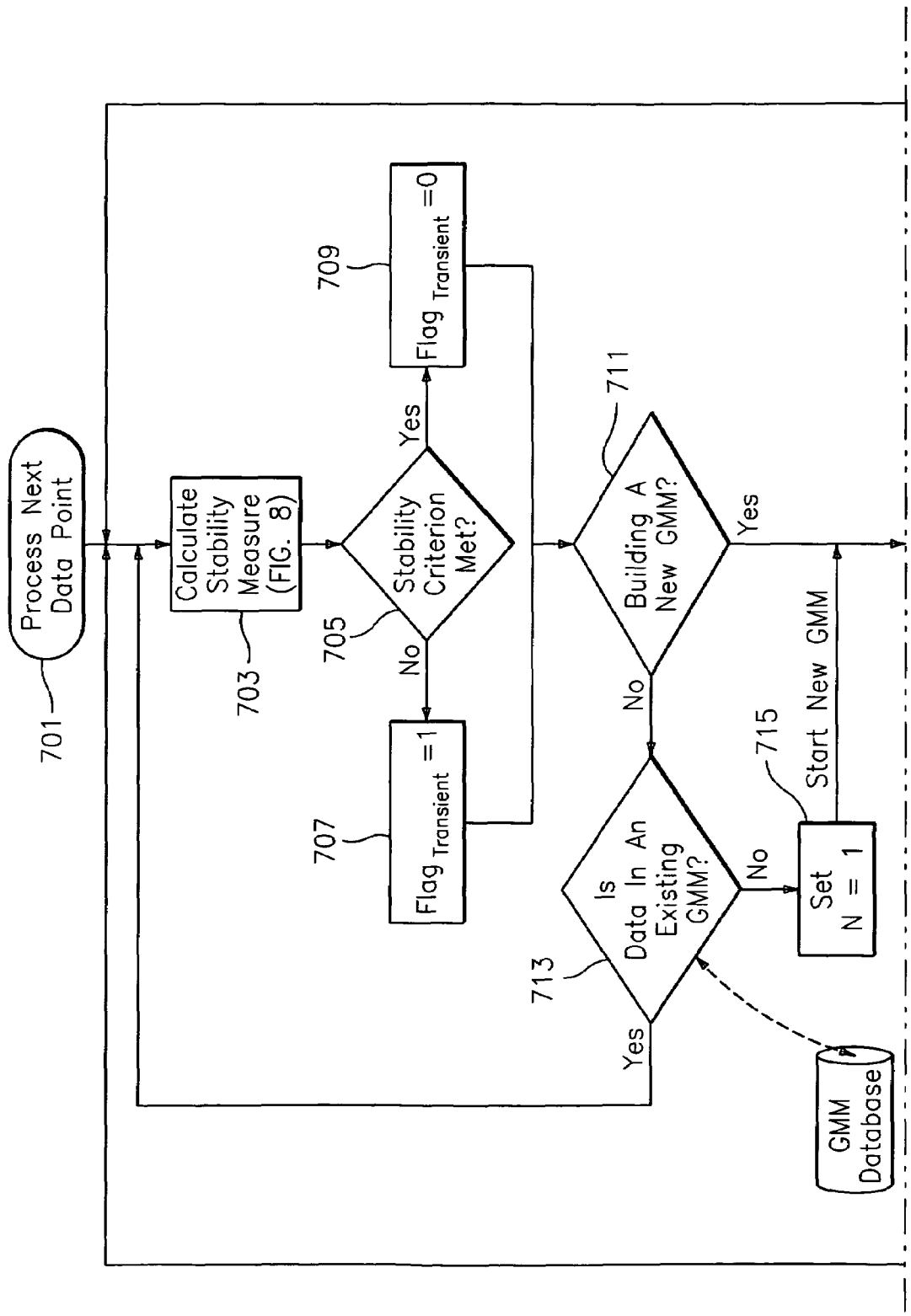
Figure 7B:
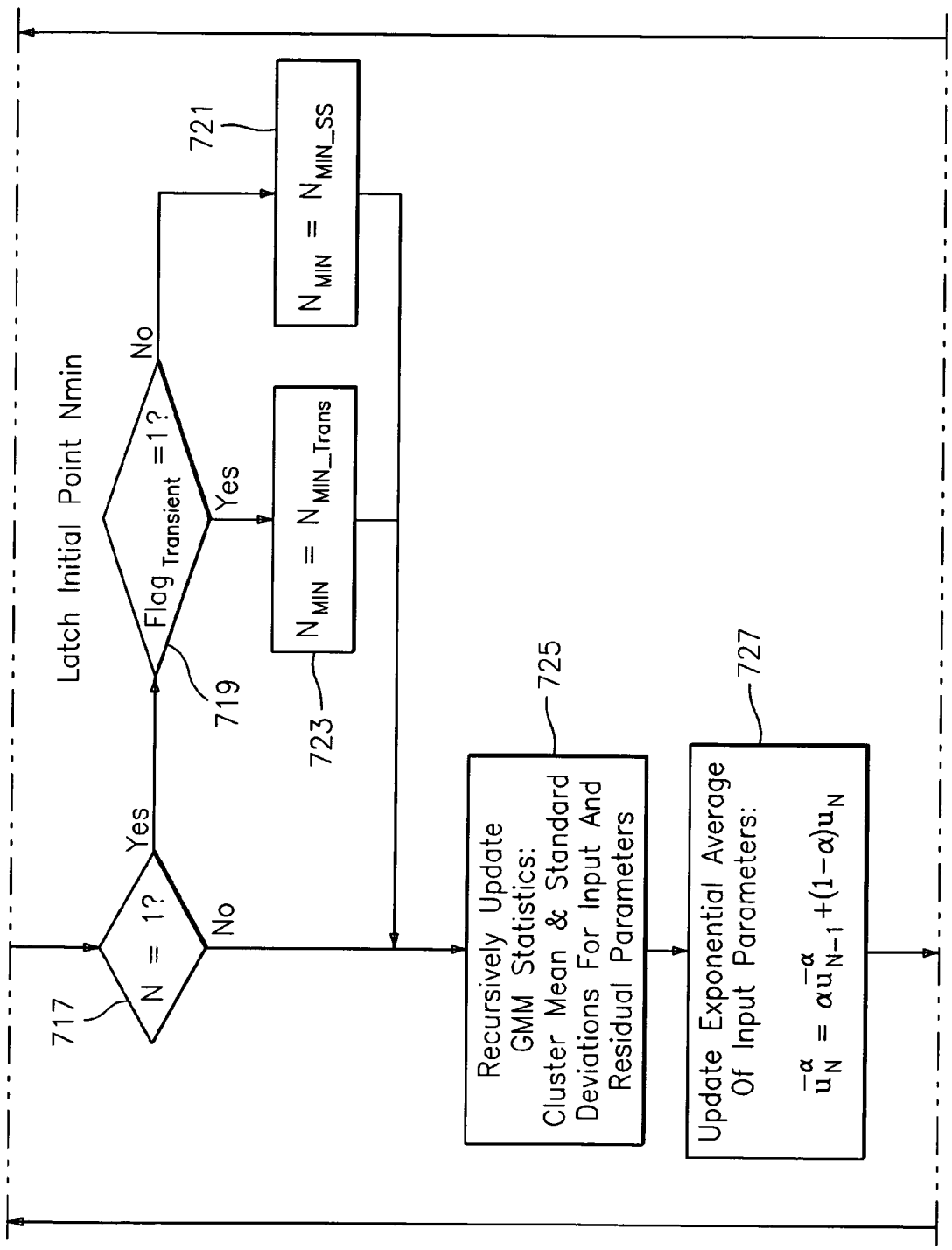
Figure 7C:
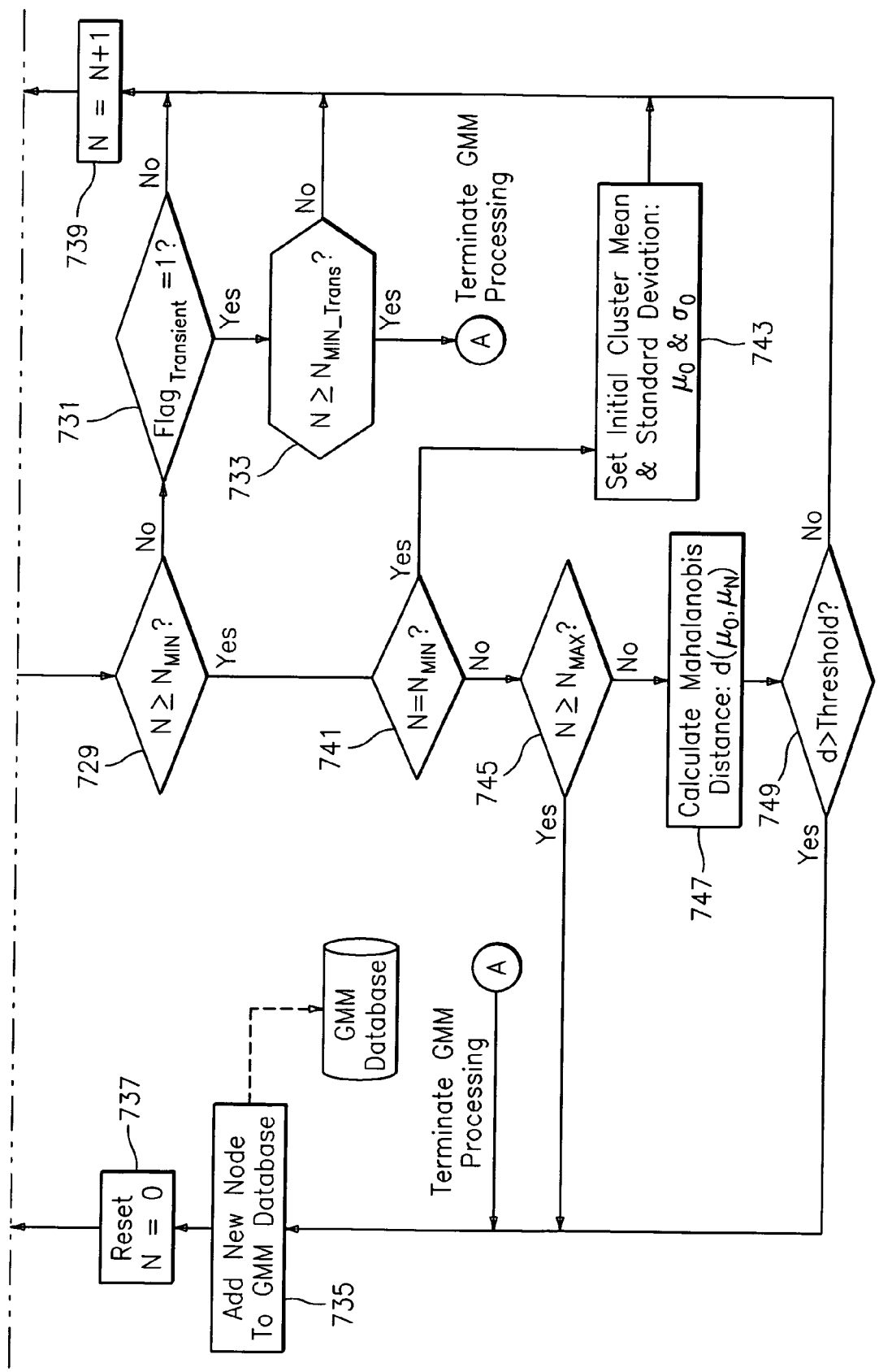
Figure 8:
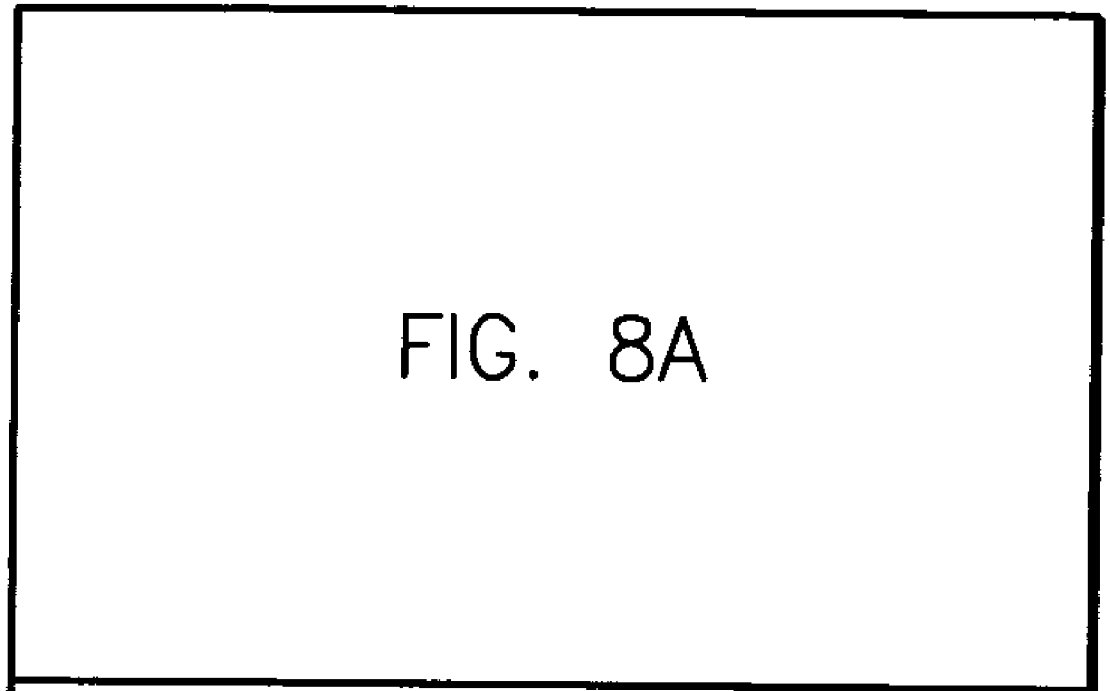
FIG. 8 is a block diagram of an exemplary stability criteria check that is used during clustering and Gaussian Mixture Model creation.
Figure 8:
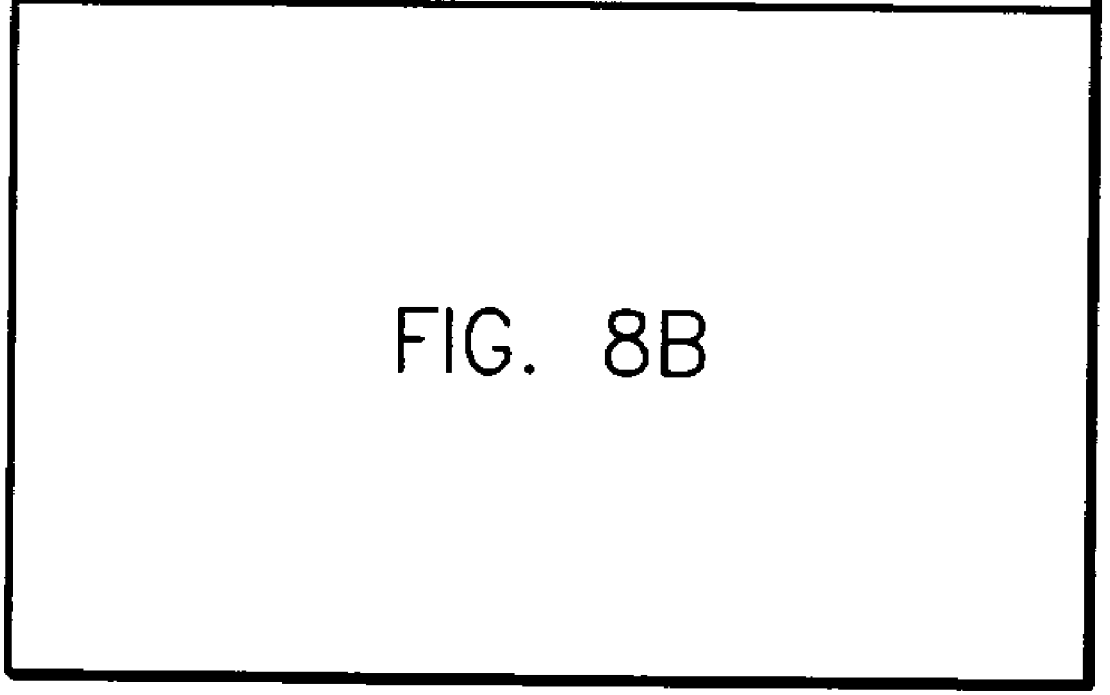
Figure 8A:
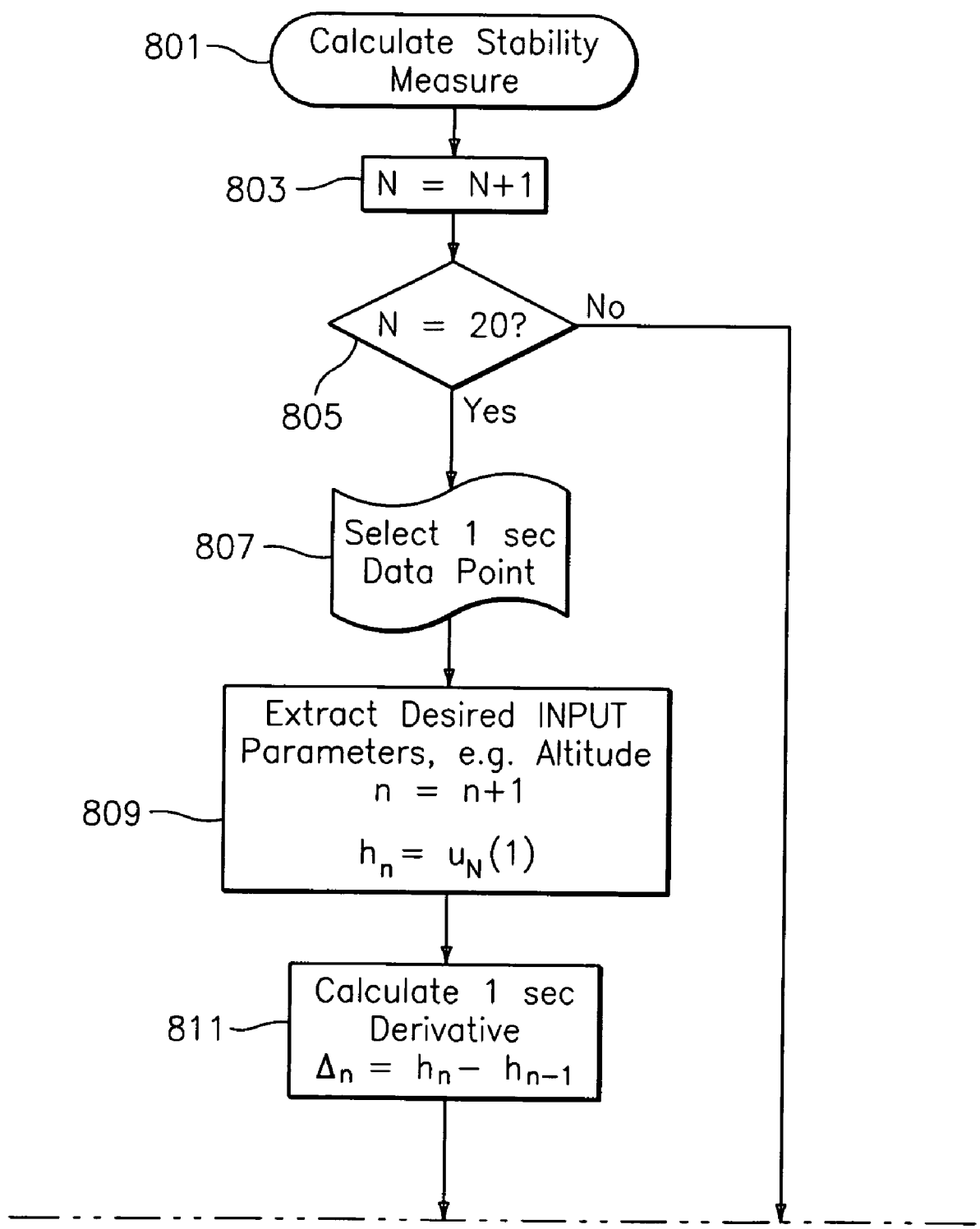
Figure 8B:
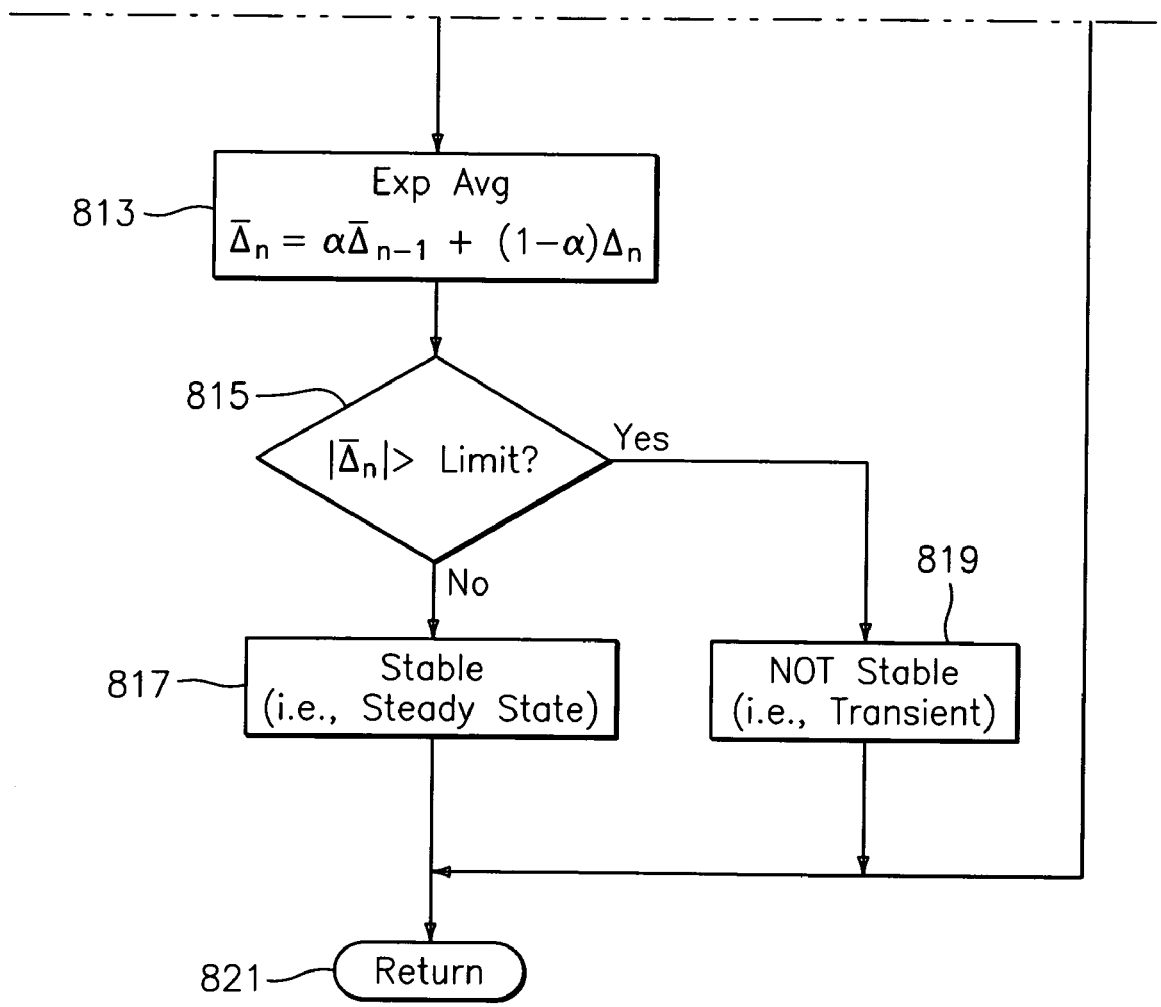
Figure 9:
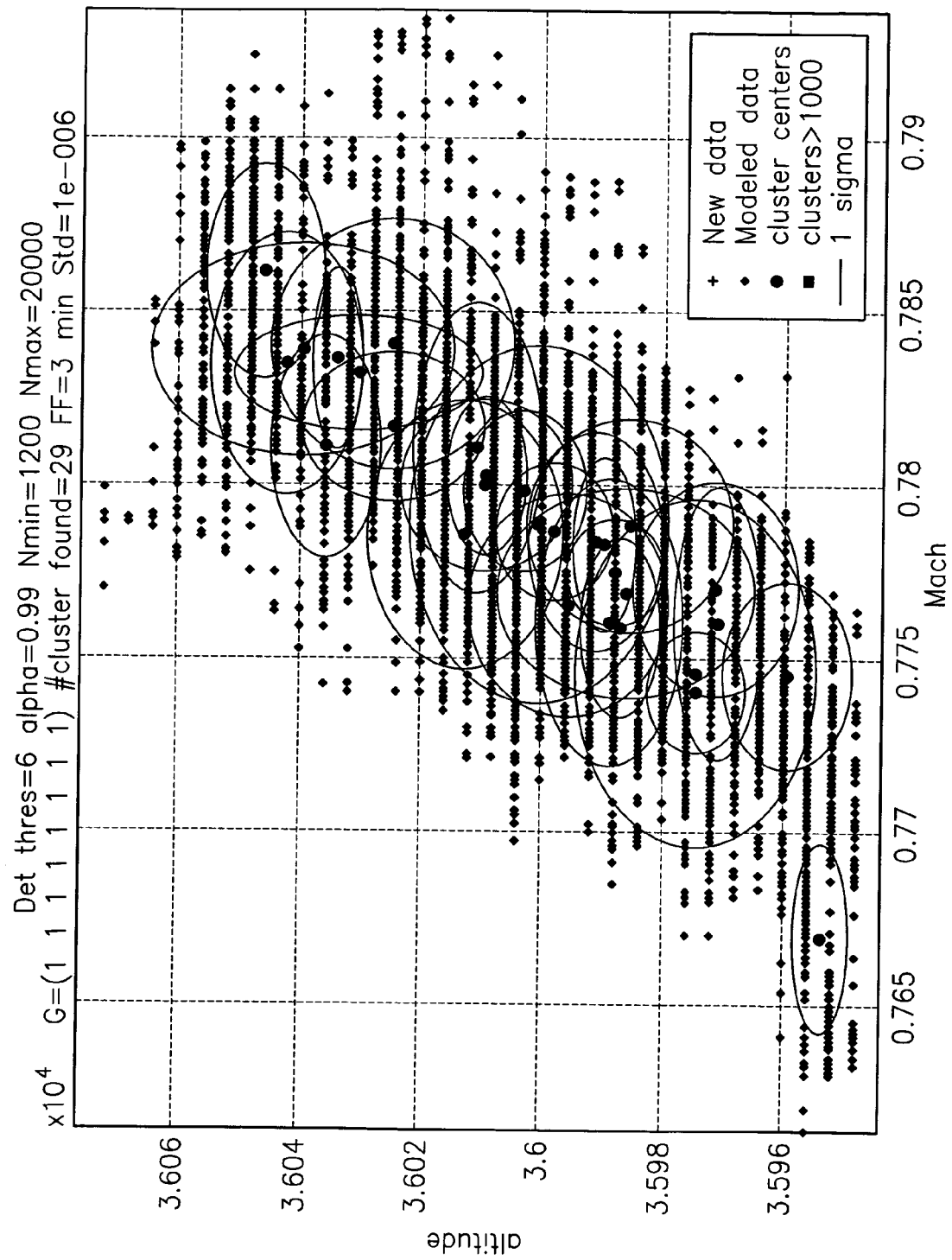
FIG. 9 is an exemplary flight envelope plot showing GMM clustering.

The GMM clustering method performed in the GMM cluster engine 503 is shown in FIGS. 7, 8 and 9. To form a GMM cluster, a minimum number of data points, $N_{MIN}$, is required. $N_{MIN}$ depends on whether the data is acquired during steady state operation, where the input parameters are not migrating (altitude and Mach constant), or in a transient condition where the aircraft is in a climb or a decent.

The clustering method begins where the current data point (step 701) is examined to determine if it was acquired during a steady state or transient condition. A stability metric is computed (step 703) as shown in FIG. 8.

The stability metric determines whether or not the aircraft is climbing or descending. The metric indicates if the flight condition is changing rapidly which impacts the choice of $N_{MIN}$. If the flight condition is stable, $N_{MIN}$ may be larger than if the flight condition is varying quickly. $N_{MIN}$ insures that more GMMs are created (per data quantity) during a transient for better resolution.

The stability metric trends (steps 801 and 803) the incoming data over a predefined number of data points (step 805). A time period is preselected to serve as a time base for measuring a rate of change of data N (step 807). A change in rate is calculated, for example, using altitude as one input parameter (steps 809 and 811). The derivative, $\Delta_n$, may be an averaged rate of change of altitude computed from altitude data, or a complex measure that takes into account other flight and engine power parameters as necessary (step 813). The averaged derivative, $\overline{\Delta}_n$, is compared with a predefined limit (step 815) to determine whether the aircraft is within a margin that identifies either steady state (step 817) or transient behavior (steps 819 and 821).

Returning to FIG. 7, once the stability metric is determined (step 705), a corresponding flag, $Flag_{Transient}=1$ (step 707) indicating a transient condition or $Flag_{Transient}=0$ (step 709) indicating a steady state condition is set.

The method determines if a new GMM cluster is in progress (step 711). If the method is not creating a new GMM for a current data point N, the method determines if the current data point belongs to an existing GMM (step 713).

To determine whether a data point belongs to an existing GMM, the method computes a Euclidean distance measured from the current data point to each GMM in the database. The minimum distance is compared to a threshold. If the threshold is exceeded, the current data point is not included in an existing GMM, otherwise it is included in at least one database 505 GMM. The distance calculation only involves independent parameters, i.e. the inputs in the current data point and the GMMs that the data points are being compared with in the database. The distance metric may be computed in a plurality of ways. A preferred implementation is to compute the distances $D_M$ as $$D_M = \sqrt{\sum_{i=1}^{m_c}\left(\frac{u_N(i)-c_u^{(M)}(i)}{\gamma(i)s_u^{(M)}(i)}\right)^2} \quad (6)$$

where $c_u^{(M)}$ and $s_u^{(M)}$ are the mean and standard deviation vector, respectively, of the inputs of the $M^{th}$ GMM in the database, $u_N$ is the input vector associated with the current $N^{th}$ data point and $\gamma$ is a pre-specified normalizing vector of constants. (6) calculates a root sum of squares (RSS) of the vectors, arriving at a Euclidean distance. Once the distances $D_M$ are calculated, a minimum, $D_{GMM}$, across all of the GMMs in the database is determined and compared to the threshold $$D_{GMM} = \min_{M \in GMM}\{D_M\}. \quad (7)$$

If the threshold is not exceeded, then the current $N^{th}$ data point is included in an existing GMM and the hybrid model may be run in the frozen mode described above. If the threshold is exceeded, the current data point is the first data point in the generation of a new GMM cluster and the counter N is set to 1 (step 715).

If a new GMM is being created (step 717), a minimum number specification for steady state $N_{MIN\_SS}$ (step 721) and a minimum number specification for transient $N_{MIN\_Trans}$ (step 723) are determined, where $N_{MIN\_SS} > N_{Min\_Trans}$. $N_{MIN}$ (from steps 721 and 723) is set to either $N_{MIN\_SS}$ or $N_{MIN\_Trans}$ if the transient flag was set to a 0 or a 1. This test examines the rate of change of inputs, for example altitude, and determines if the rate exceeds a predefined limit. If the rate exceeds the predefined limit, $N_{MIN}$ takes the value of $N_{MIN\_Trans}$. If the rate does not exceed the predefined limit, $N_{MIN}$ takes the value of $N_{MIN\_SS}$.

The method recursively updates the averages and standard deviations of the input 109 and residual 501 parameters of the GMM cluster that is currently in formation (step 725). A running exponential average, $\overline{u}_N^\alpha$, of the input parameters is calculated (step 727) as $$\overline{u}_N^\alpha(i) = \alpha \overline{u}_{N-1}^\alpha(i) + (1-\alpha)u_N(i), \text{ for } i=1, 2, \ldots, m_c, \quad (8)$$

where $\overline{u}_N^\alpha(i)$ is the running exponential average of the $i^{th}$ element of the input vector, $u_N(i)$ is the current $N^{th}$ data point for the $i^{th}$ element of the input vector, $\alpha$ is the predefined exponential averaging constant and $m_c$ is the number of elements in the input vector.

The minimum number of points, $N_{MIN}$, to be collected for a new GMM is determined at the onset of the GMM formation, when N=1 (steps 715). If the data at N=1 was stable, the minimum value $N_{MIN}$ is set at $N_{MIN\_SS}$ (step 721). If the aircraft subsequently begins to climb or descend and a transient condition is perceived (through FIG. 8) and N>1, the minimum value $N_{MIN}$ is effectively reset to $N_{MIN\_Trans}$ to ensure that the GMM provides proper coverage during the transient condition. The effective re-setting of $N_{MIN}$ (steps 731 and 733) ends GMM processing once $N \geq N_{MIN\_Trans}$ and stores the newly formed GMM in the GMM database (step 735). N is reset to 0 (step 737). If $N < N_{MIN\_Trans}$ (step 733), the method increments the current data point N counter N=N+1 (step 739) and returns for a new data point.

Once $N_{MIN}$ data points have been collected (step 741), the initial GMM cluster mean and standard deviation vectors $\mu_0$ and $\sigma_0$ for the input vector u are determined (step 743) and are temporarily stored for reference.

The statistics are updated for each incoming data point until an exit criterion is satisfied to end the GMM clustering process and establish a new GMM cluster point for the database. The method provides two exit criteria.

If N represents the current number of data points in the current GMM cluster which is being formed, the method ends when one of two conditions are met, i.e., either N is larger than a predefined maximum $N_{MAX}$, $(N \geq N_{MAX})$ (step 745) or the running average $\bar{u}_N^\alpha$ has migrated sufficiently far from the initial average $\mu_0$. The latter condition is tested by calculating a Mahalanobis vector distance $d(\mu_0, \bar{u}_N^\alpha)$ (step 747) and comparing it to a predefined threshold (step 749). The distance measure is calculated by $$d(\mu_0, \bar{u}_N^\alpha) = \sqrt{\sum_{i=1}^{m_c} \left( \frac{\bar{u}_N^\alpha(i) - \mu_0(i)}{\gamma(i)\sigma_0(i)} \right)^2}, \quad (9)$$

where $\gamma(i)$ is a weighting factor for the $i^{th}$ input parameter noise sensitivity. The clustering process ends if either condition $$d(\mu_0, \bar{u}_N^\alpha) \geq \text{Threshold}, \quad (10)$$

or $$N \geq N_{MAX} \quad (11)$$

is satisfied. When the current cluster terminates, the newly formed GMM is added to the database (step 749) and the next data point received follows the same overall process to determine if it is within the domain of an existing GMM and if not, a new GMM formation is initiated.

The newly formed GMM includes a vector of averages for the input and residual parameters, a vector of standard deviations for the input and residual parameters, and a sample size associated with those statistical calculations (equations 1-4). Shown in FIG. 9 is a partial cell of a flight envelope cell depicting GMM and sample data locations. The small dots represent the location in terms of altitude and Mach for the sample data. As described above, there are other input variable parameters other than altitude and Mach since each data sample is an $m_c \times 1$ vector. However, only two input parameters are shown plotted for convenience. The large dots represent the locations of the GMM centers (averages) and the ellipses represent the GMM 1-sigma standard deviations about those centers. It may be evident that 3-sigma ellipses would encompass all of the small dots. In this regard, the GMMs form a compressed representation of the data and cover the data.

When a data point is determined to be within the domain of an existing GMM, it is processed by the (existing) hybrid model 303 using current MLP empirical model elements. Since the data point is already represented by an existing GMM, an existing MLP empirical model provides the requisite compensation to allow performance estimation to be determined without corruption. If the data point is not within the domain of an existing GMM, the hybrid model is run in frozen mode and a new GMM cluster process is initiated for the data point as described above.

Figure 1:
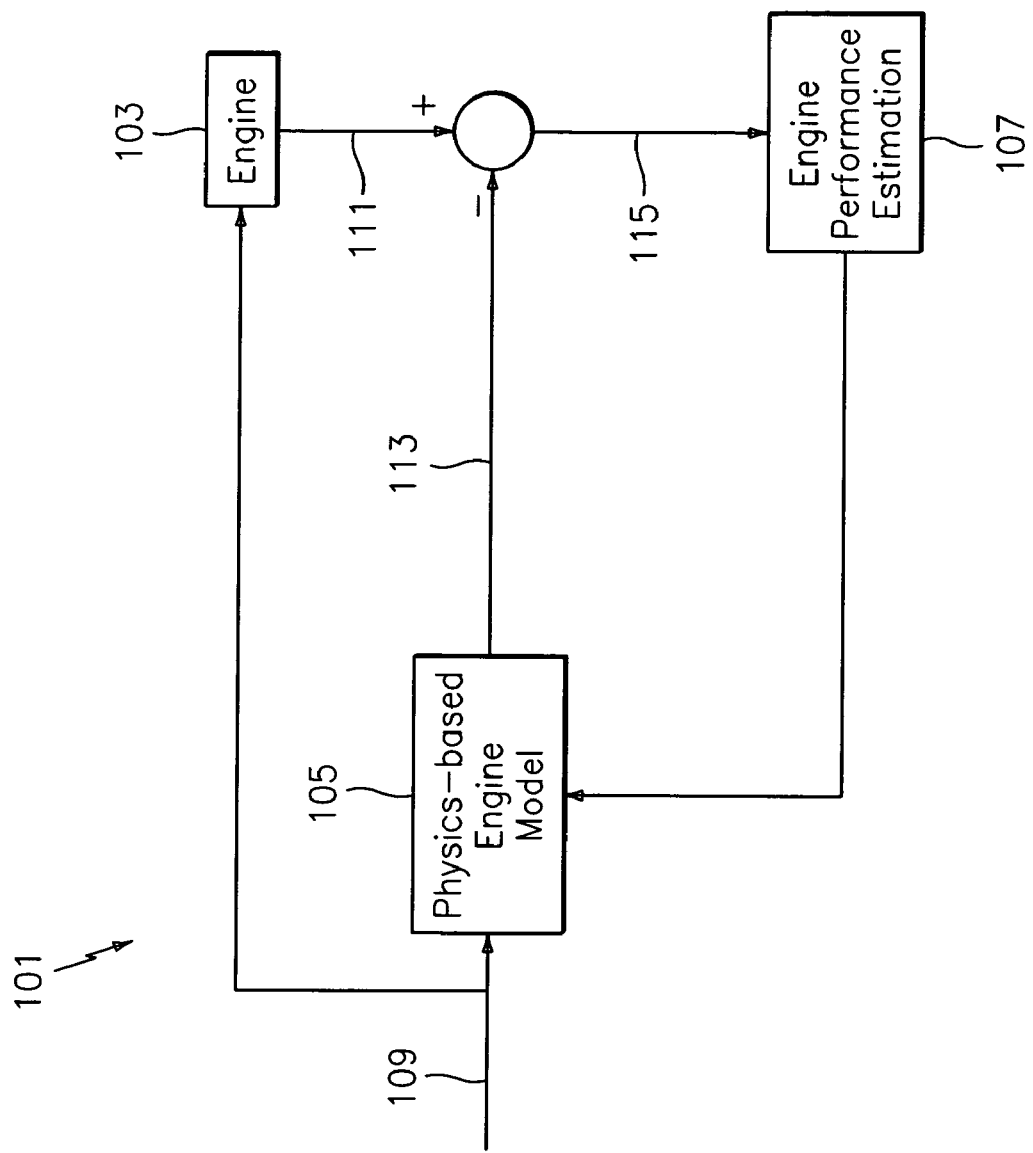
FIG. 1 is an exemplary system for modeling a gas turbine engine.
Figure 2:
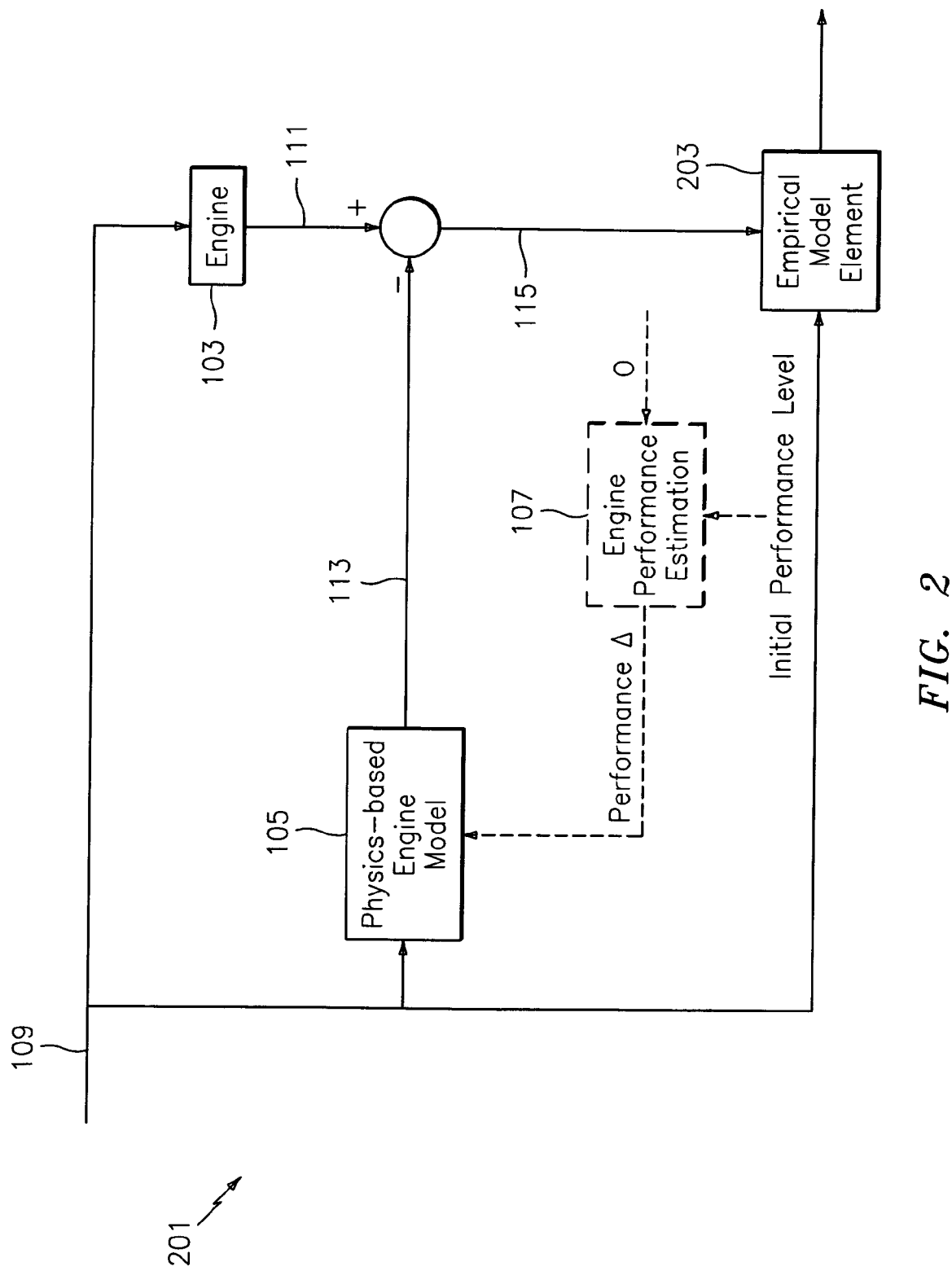
FIG. 2 is an exemplary system for modeling a gas turbine engine that derives an empirical model.
Figure 3:
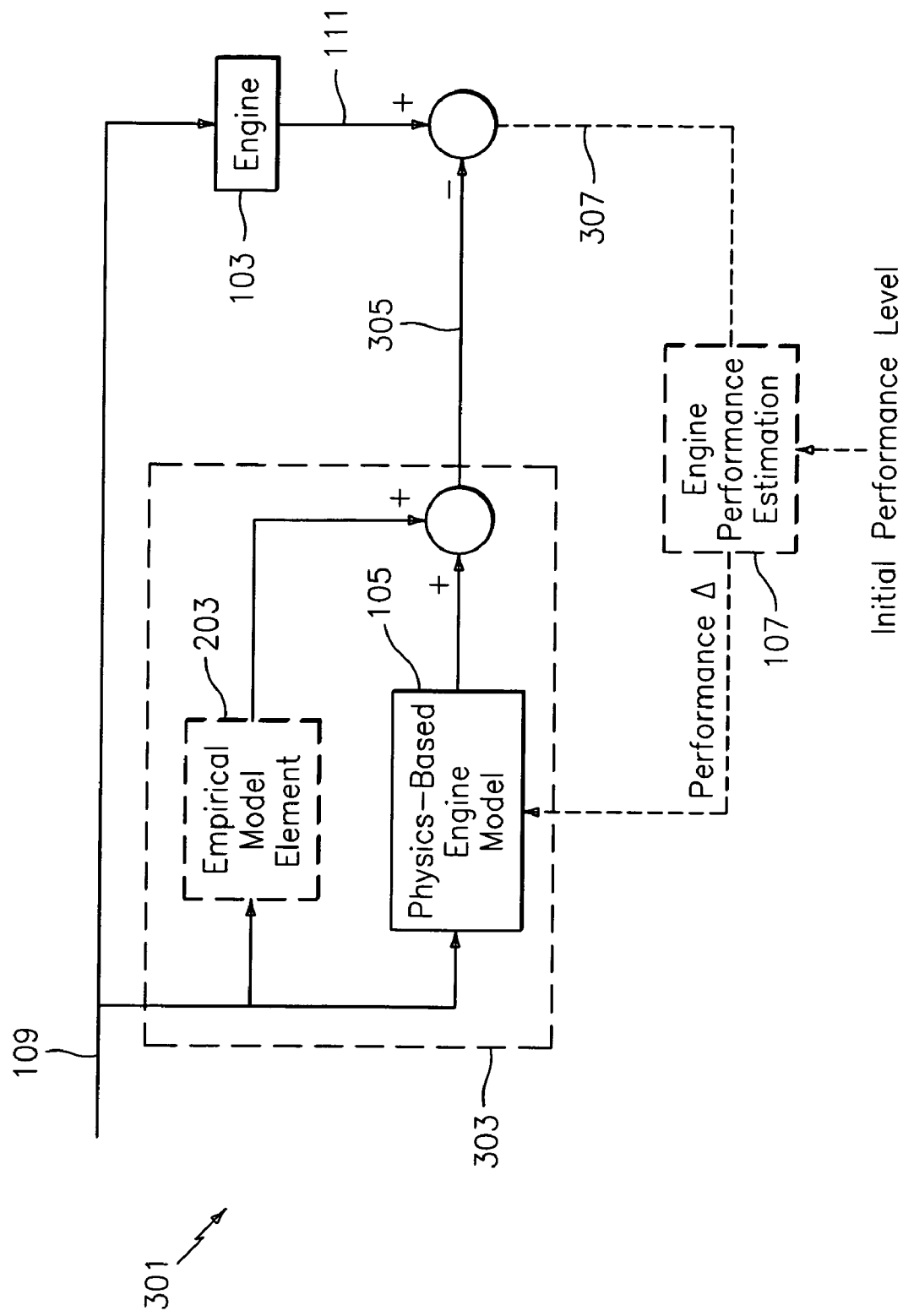
FIG. 3 is an exemplary hybrid system for modeling a gas turbine engine.

Frozen mode processes the data point as indicated in FIG. 2 where the initial performance level input to the Kalman filter is frozen at the last known value estimated (from data within the current GMM database domain). Maintaining the value at the last known value estimate insures that the residuals used in the GMM cluster formation do not contain presently known deterioration effects. This mode only views (empirically) the differences between the engine 103 and physics-based model 105 and does not capture any deterioration that might have accrued since commencing engine 103 operation.

Once a flight has terminated, the second stage 513 of the invention is initiated. The GMM database 505 is examined for newly generated clusters on a cell-by-cell basis. If a given cell 401 is found to have newly generated GMMs, the entire collection of GMMs for that cell are used to generate a new MLP empirical model for each of the residual measurements. The collection of GMMs within a cell contain a compact representation of flight data that occurred within that cell in the form of input parameter and residual parameter averages, means and standard deviations, and associated sample sizes. This compact data representation can be modeled using an MLP. The second stage 513 modeling process may be performed off-line after flight termination, and the subsequent MLPs generated are stored in the empirical model data store 509 replacing and updating the previously stored MLPs. The MLPs in the data store 509 constitute the empirical model element 203 in the hybrid model 303 for subsequent analysis of future flight data.

One or more embodiments of the present invention have been described. Nevertheless, it will be understood that various modifications may be made without departing from the spirit and scope of the invention. Accordingly, other embodiments are within the scope of the following claims.

What is claimed is:

1. A method of training a multi-layer network used in conjunction with a physics-based engine model to define a hybrid model for modeling a gas turbine engine used for flight comprising:
    inputting an input signal to the gas turbine engine for operational control and to the physics-based engine model, wherein the input signal comprises a plurality of parameters;
    combining output parameters from the gas turbine engine with corresponding parameters estimated by the physics-based engine model to form a residual for each parameter, the gas turbine output parameters and physics-based engine model estimated parameters are responsive to the input signal parameters;
    deriving a mean and a standard deviation for each parameter of a first predetermined number of the input signals;
    deriving a mean and a standard deviation for residuals responsive to the first predetermined number of the input signals;
    associating a mean Mach and a mean altitude, wherein the Mach and altitude are input signal parameters, with one of a plurality of flight envelope cells, wherein if a parameter of the input signal or a responsive residual parameter is included in a pre-existing statistical distribution, the pre-existing distribution is used for training the multi-layer network, and if the mean Mach and the mean altitude are not included in a pre-existing statistical distribution, a new statistical distribution is created comprising the mean and standard deviation for each parameter of the first predetermined number of the input signals, the mean and standard deviation for residuals responsive to the first predetermined number of the input signals, and the first predetermined number value.

2. The method according to claim 1 further comprising calculating distances from the mean Mach and mean altitude to a plurality of flight envelope cell centers.

3. The method according to claim 2 further comprising selecting a cell that is the shortest distance to the mean Mach and mean altitude.

4. The method according to claim 3 further comprising comparing each independent input signal parameter from the input signal with pre-existing statistical distributions within the associated cell, wherein if an independent parameter of the input signal is included in a pre-existing statistical distribution, the pre-existing distribution is used for training the multi-layer network, and if an independent parameter of the input signal is not included in a pre-existing statistical distribution, a new statistical distribution is created for each input signal parameter from the input signal.

5. The method according to claim 4 wherein the statistical distribution is a Gaussian mixture model.

6. The method according to claim 5 further comprising normalizing the mean for each parameter of the first predetermined number of the input signals and the mean for each parameter of the residuals responsive to the first predetermined number of input signals.

7. The method according to claim 6 further comprising calculating a stability measurement that determines whether the input signal parameters exhibit steady state or transient behavior.

8. The method according to claim 7 further comprising examining a change of rate (slope) of at least one parameter of the input signal over a second predetermined number of input signals, wherein if the change of rate is greater than a predetermined threshold, the input signal is exhibiting transient behavior.

9. The method according to claim 8 wherein if the input signal is exhibiting steady state behavior, the first predetermined number is set at a steady state value.

10. The method according to claim 9 wherein if the input signal is exhibiting transient behavior, the first predetermined number is set at a transient value.

11. The method according to claim 10 further comprising stopping creating the statistical distribution when the first predetermined number is greater than a preset limit.

12. The method according to claim 10 further comprising calculating a statistical measure (Mahalanobis distance) correlating the mean for each parameter of the first predetermined number of the input signals with an initial average, and stopping creating the statistical distribution when the statistical measure is greater than a third predetermined number.

13. The method according to claim 11 further comprising storing the statistical distribution in a statistical distribution data store.

14. The method according to claim 13 further comprising training the multi-layer network using the statistical distributions in the statistical distribution data store.

15. A system for training a multi-layer network used in conjunction with a physics-based engine model to define a hybrid model for modeling a gas turbine engine used for flight comprising:

means for inputting an input signal to the gas turbine engine for operational control and to the physics-based engine model, wherein the input signal comprises a plurality of parameters;

means for combining output parameters from the gas turbine engine with corresponding parameters estimated by the physics-based engine model to form a residual for each parameter, the gas turbine output parameters and physics-based engine model estimated parameters are responsive to the input signal parameters;

means for deriving a mean and a standard deviation for each parameter of a first predetermined number of the input signals;

means for deriving a mean and a standard deviation for residuals responsive to the first predetermined number of the input signals;

means for associating a mean Mach and a mean altitude, wherein the Mach and altitude are input signal parameters, with one of a plurality of flight envelope cells, wherein if a parameter of the input signal or a responsive residual parameter is included in a pre-existing statistical distribution, the pre-existing distribution is used for training the multi-layer network, and if the mean Mach and the mean altitude are not included in a pre-existing statistical distribution, a new statistical distribution is created comprising the mean and standard deviation for each parameter of the first predetermined number of the input signals, the mean and standard deviation for residuals responsive to the first predetermined number of the input signals, and the first predetermined number value.

16. The system according to claim 15 further comprising means for calculating distances from the mean Mach and mean altitude to a plurality of flight envelope cell centers.

17. The system according to claim 16 further comprising means for selecting a cell that is the shortest distance to the mean Mach and mean altitude.

18. The system according to claim 17 further comprising means for comparing each independent input signal parameter from the input signal with pre-existing statistical distributions within the associated cell, wherein if an independent parameter of the input signal is included in a pre-existing statistical distribution, the pre-existing distribution is used for training the multi-layer network, and if an independent parameter of the input signal is not included in a pre-existing statistical distribution, a new statistical distribution is created for each input signal parameter from the input signal.

19. The system according to claim 18 wherein the statistical distribution is a Gaussian mixture model.

20. The system according to claim 19 further comprising means for normalizing the mean for each parameter of the first predetermined number of the input signals and the mean for each parameter of the residuals responsive to the first predetermined number of input signals.

21. The system according to claim 20 further comprising means for calculating a stability measurement that determines whether the input signal parameters exhibit steady state or transient behavior.

22. The system according to claim 21 further comprising means for examining a change of rate (slope) of at least one parameter of the input signal over a second predetermined number of input signals, wherein if the change of rate is greater than a predetermined threshold, the input signal is exhibiting transient behavior.

23. The system according to claim 22 wherein if the input signal is exhibiting steady state behavior, the first predetermined number is set at a steady state value.

24. The system according to claim 23 wherein if the input signal is exhibiting transient behavior, the first predetermined number is set at a transient value.

25. The system according to claim 24 further comprising means for stopping creating the statistical distribution when the first predetermined number is greater than a preset limit.

26. The system according to claim 24 further comprising means for calculating a statistical measure (Mahalanobis distance) correlating the mean for each parameter of the first predetermined number of the input signals with an initial average, and stopping creating the statistical distribution when the statistical measure is greater than a third predetermined number.

27. The system according to claim 25 further comprising means for storing the statistical distribution in a statistical distribution data store.

28. The system according to claim 27 further comprising means for training the multi-layer network using the statistical distributions in the statistical distribution data store.

* * * * *